April 30, 1968 W. R. JOHNSON ET AL 3,381,085

DUPLICATION OF VIDEO DISC RECORDINGS

Filed May 9, 1962 3 Sheets-Sheet 1

INVENTORS:
Wayne R. Johnson
Dean L. De Moss

By Smyth, Roston & Pavitt

Attorneys

DUPLICATION OF VIDEO DISC RECORDINGS

INVENTORS:
Wayne R. Johnson
Dean L. De Moss
By Smyth, Roston & Pavitt
Attorneys

DUPLICATION OF VIDEO DISC RECORDINGS

Filed May 9, 1962 3 Sheets-Sheet 3

INVENTORS:
Wayne R. Johnson
Dean L. DeMoss
By Smyth, Roston & Pavitt
Attorneys

United States Patent Office 3,381,085
Patented Apr. 30, 1968

3,381,085
DUPLICATION OF VIDEO DISC RECORDINGS

Wayne R. Johnson, Los Angeles, and Dean L. De Moss, Glendale, Calif., assignors to Minnesota Mining and Manufacturing Company, St. Paul, Minn., a corporation of Delaware Filed May 9, 1962, Ser. No. 193,534
12 Claims. (Cl. 178—6.7)

This invention relates to a system for obtaining a recording of information such as video and audio information on a storage medium such as a master disc and for obtaining a subsequent recording of the information from the master disc on a copy disc. The invention also includes means for subsequently reproducing the information recorded on the copy disc.

In recent years, systems have been constructed which record high-frequency information on a storage medium with a subsequent reproduction of the information from the storage medium or from copies of the storage medium. For example, information having characteristics which represent video and audio signals at successive instances of time have been recorded on a magnetic tape. Signals representing different scientific and mathematical information have also been recorded on magnetic tape.

The systems now in use generally employ magnetic tapes as a storage medium for the recording of high-frequency information. These tapes have proved fairly successful but the magnetic structure of the tape limits the fidelity of the recording and reproduction so that the magnetic tapes have to be recorded with considerable precision. The information recorded on the tapes also has a limited density so that a relatively great amount of tape is required to store the information represented. The systems now in use are also limited by the speed or response of the magnetic transducer heads in combination with the magnetic particles of the tape.

The systems now in use generally use a transducing head disposed adjacent to the tape to record information in magnetic form on the tape and to reproduce the magnetic information as electrical signals from the tape. The adjacent relationship between the transducing head and the tape occasionally causes the tape to rub against the head so that magnetic particles become removed from the tape and are deposited on the head to affect the operation of the head. The magnetic particles removed from the tape tend to produce an abrasive action on the head. This abrasive action may permanently affect the response characteristics of the head.

It is also difficult to use a magnetic tape as a master for the reproduction of a large quantity of identical tapes because of the wear on the tape due to the adjacent head configuration of the system. The large amount of tape required for the master also limits the number of reproductions which can be made in any particular amount of time. It would, therefore, be desirable to use discs as the master since they tend to store information in a relatively compact form. The information on a disc is also relatively easy to reproduce from a master to copies such that the copies can be sold on a volume basis at a relatively low price. However, the disc systems of the prior art have generally involved a groove cut in a disc of plastic material with variations in the wall of the groove representing the electrical information.

The prior art disc systems have had certain important deficiences. For example, the reproducing means has generally engaged the disc. For example, the reproducing means has constituted a needle which has contacted a groove in the disc to reproduce the information on the disc. This contact between the needle and the groove has tended to wear the disc after the disc has been used several times. It has also tended to wear the needle so as to reduce the subsequent fidelity of reproduction from the disc.

This invention provides a system which uses a master disc as a storage medium and which is responsive to information to be recorded so as to vary the light transmission characteristics of the disc in accordance with such information. For example, the light transmission characteristics of the master disc are varied in a spiral track during the recording information by an electron beam whose characteristics are controlled by signals representative of the incoming information. The intensity of the beam may be varied in accordance with such information by adjusting the potential on the grid of an electron gun in accordance with the characteristics of the information to be recorded. Since the electron beam is projected toward the master disc from a position removed from the disc, no frictional forces are produced on the disc by the transducing action.

Since the information is stored on the master disc in the form of a variable track of information having variable light transmission characteristics, it is relatively easy to reproduce information from the master disc to a copy disc or to working master discs by the use of photographic means. The working master disc has on one surface a coating of photographic material which is placed in contact with the recorded surface of the original master disc. The two discs are accurately aligned by means around the peripheral edges of the two discs. The information is then transferred from the original master to the working master by flooding the two discs with light to produce a contact print of the information on the original master on the photographic surface of the working master.

This invention also provides means for recording the information from the working master disc on copy discs. Since the copy discs are sold commercially, it is desirable to make them light weight so that they can be easily handled. The copy discs are constructed of a thin disc of plastic material such as "Mylar" and may be provided with supporting rings around their periphery. The disc has a coating of photographic material on one surface. The ring may have indentations or protrusions such as fins to act as air scoops.

The copy disc is rotated at a constant speed adjacent to the working master by the application of air to the air scoops included on the ring. Since the entire copy disc is free-floating above the working master, it tends to find its natural center of rotation. The working master is also rotated at the same speed as the copy disc, and when the two discs are in synchronism the copy disc is clamped to the working master. A print of the information on the working master is then transferred photographically to the copy disc. By controlling the copy disc to rotate on a free-floating basis at the same speed as the master disc and by clamping the copy and the working master discs upon a synchronous rotation of the discs, inconsistencies in the manufacture of the copy disc are minimized. For example, such inconsistencies may otherwise cause the copy disc to have eccentric rotations, thereby affecting the accuracy with which information is reproduced from the disc.

Another feature of the invention is the rotation of the copy disc in a free-floating state during reproduction of the information on the copy disc. In this manner, the copy disc has the same natural center of rotation during re-recording and reproduction. This insures an exact reproduction of the information originally recorded on the master disc. The air scoops on the ring are again used to supply a rotation of the disc. As the disc rotates, a light source and photoelectric means are used to reproduce the information on the disc.

This invention also provides means for maintaining the speed of the copy disc substantially constant during reproduction of the information on the copy disc. A control signal is included in the information recorded on the disc and is used to control the supply of air which rotates the disc. If the information recorded on the copy disc is a video signal representing black and white information, the horizontal sync signal may be used as the control signal to regulate the speed of rotation of the copy disc. Alternatively, if the information recorded on the copy disc is a video signal representing color information the reference burst preceding the signals representing the color information may be used as the control signal to regulate the speed of rotation of the copy disc.

The invention further relates to various features in the copy disc itself. For example, one inventive feature of the copy disc relates to means such as fins on the disc or grooves in the disc for facilitating a free-floating rotation of the disc both during recording and reproduction. Another inventive feature of the disc relates to means on the disc for obtaining a clamping of the disc to the working master disc when the speed of rotation of the copy disc has been adjusted to that of the working master disc. As previously described, the light transmission characteristics of the working master disc become transferred to the copy disc after the copy disc has become clamped to the working master disc. Still another inventive feature of the invention relates to the provision of information on both of the flat surfaces of the copy disc to represent different information as on the two sides of audio records or to represent stereoscopic information when the information on both sides of the copy disc is reproduced simultaneously.

Other features of the invention include methods of producing working master discs from an original master disc such that the light transmission characteristics at the progressive positions in a spiral track on the original master disc become transferred to corresponding positions on the working master disc. The invention further relates to methods of transferring the light transmission characteristics on the spiral track of the working master disc to corresponding positions on a copy disc. Methods are also included in the invention for simultaneously transferring information to the opposite flat surfaces of the copy disc to represent stereoscopic information and for simultaneously reproducing such information from the opposite flat surfaces of the disc to obtain a visual stereoscopic presentation.

Figures 1, 2, 3, 4, 5, 6, 7:
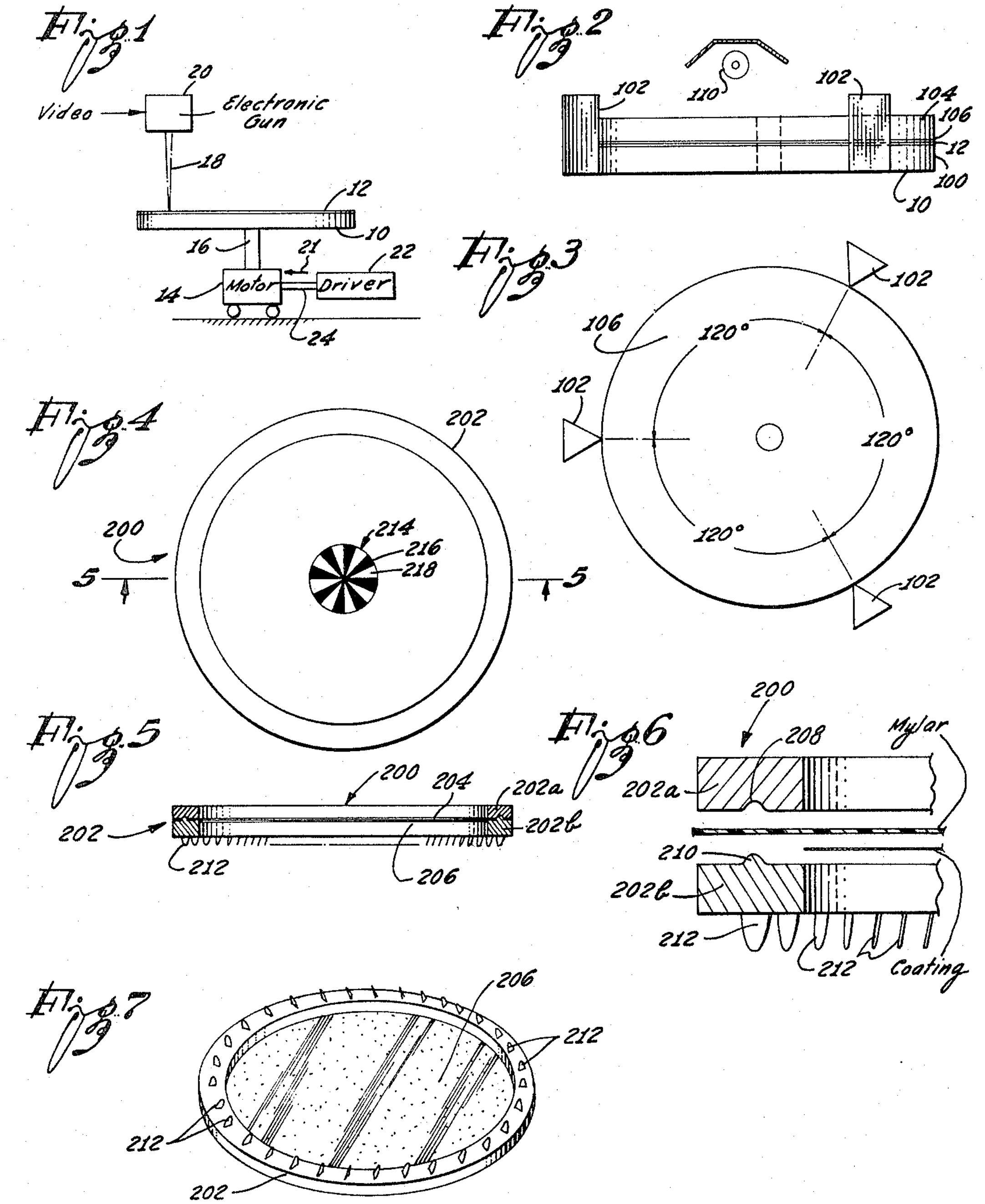
FIGURE 1 shows a schematic representation of a system for recording information on a master disc.
FIGURE 2 shows apparatus for making working masters from an exposed original master disc.
FIGURE 3 is a top plan view of the apparatus illustrated in FIGURE 2.
FIGURE 4 is a top plan view of a copy disc used for making a recording of the information on a working master.
FIGURE 5 is a sectional view of the copy disc shown in FIGURE 4 and taken substantially on the line 5—5 of FIGURE 4.
FIGURE 6 shows an enlarged fragmentary elevational view of the structure of the ring which supports the disc of FIGURES 4 and 5.
FIGURE 7 is a perspective view of the disc of FIGURE 4, and illustrates in some detail the structure and location of the air scoops.

FIGURE 1 shows an apparatus for recording a video signal on an annular recording member such as a master disc 10 which may be made of a suitable material such as glass or quartz. The master disc 10 has a coating 12 of photographic material. The photographic material 12 has characteristics of being responsive to charged particles to change the light transmission characteristics of the coating 12. The master disc 10 is rotated at a constant speed by a motor 14 through a shaft 16. During recording, the disc 10 is exposed to a beam of energy 18 by an electron gun 20. The beam of energy 18 strikes the master disc 10 with a variable intensity in accordance with information supplied to the electron gun 20. By way of example, the electron gun 20 is shown as controlled by a video signal. The construction and operation of the electron gun 20 are described in full detail in copending application Ser. No. 181,393 filed on Mar. 21, 1962, by David P. Gregg for a "Transducing System."

As the master disc 10 rotates, the motor 14, shaft 16 and the disc are moved relative to the electron gun 20 by a driver 22 along a transverse line indicated by an arrow 21. The driver 22 operates through a shaft 24 to move the motor 14 at a substantially constant speed. The combination of the movement of the master disc 10 in the direction 21 relative to the beam of energy 18 plus the rotation of the master disc 10 by the motor 14 causes a spiral track of information to be produced on the coating 12 of the disc. The construction and operation of the recording system and the system for energizing the driver 22 are described in detail in copending application Ser. No. 192,930 filed on May 7, 1962 by Wayne R. Johnson and Dean L. De Moss.

FIGURES 2 and 3 show apparatus for producing working masters such as a disc 104 from the master disc 10. The peripheral edge 100 of the recording member 10 is accurately machined to define an annulus and to have the edge 100 substantially perpendicular to the coating surface 12 of the recording member 10. Knife edges 102 are illustrated as being positioned around the periphery of the recording member 10 at 120° intervals to maintain the master disc 10 and the working master disc 104 in substantially fixed position relative to each other. Although three knife edges 102 are illustrated in FIGURE 3 as being used, it will be appreciated that any other number of knife edges may also be used. It will also be appreciated that other means than knife edges may also be used.

The working master 104 has a similar structure as the original master 10. It also may be made of quartz or glass and may also be provided with a photographic coating 106 on one surface. The photographic coating 106 is responsive to light energy to vary the light transmission through the coating 106. The working master is accurately aligned on top of the original master 10 by the knife edges 102. The knife edges 102 insure the same relationship between any number of working masters and the original master. After the two masters are positioned, a contact print of the information recorded on the original master is transferred to the working master. This may be accomplished by bathing the surface of the photographic coating 106 with light 110 to transfer the pattern on the coating 12 to the coating 106. Although the apparatus shown in FIGURES 2 and 3 has been described primarily for producing a working master disc 104, it will be appreciated that similar techniques may possibly be used to produce copy discs for sale to the public.

FIGURES 4 to 7, inclusive, show a copy disc which is generally indicated at 200 and which is used for recording on the copy disc information from the working master 104. The copy disc 200 is composed of an outer split ring generally indicated at 202 and defined by portions **202*a* and 202*b*. A thin disc of plastic material 204 such as a polyethylene terephthalate designated by the trademark "Mylar" is disposed between the two halves 202*a* and 202*b* of the split ring 202. The disc 204 has on one surface a photographic coating 206 which is responsive to light energy to vary the light transmission characteristics of the coating. The copy disc 200 is manufactured by placing the thin disc of polyethylene terepthalate material 204 on the portion 202*a* of the split ring 202. The other portion 202*b* of the split ring 202 is then clamped to the portion 202*a* to secure the thin disc 204. As a further means of locking the disc 204, the portion 202*a* may be provided with a key way 208 which mates with a corresponding key 210 in the portion 202*b*. The key 210 also stretches the disc 204** uniformly so that the disc is in a flat plane.

The split ring 202 also has a series of protrusions or fins 212 which are used as air scoops for the rotation of the disc 200 during the recording of information on the disc or the reproduction of information from the disc. It will be appreciated that other means than the fins 212 may be provided on the ring 202 to act as air scoops. For example, indentations may be provided on the ring 202. A central area generally indicated at 214 is located on the disc 200 on the opposite side from the coating 206. The central area 214 has alternate areas 216 and 218, the areas 216 being formed to absorb light directed toward the central area 214 and the areas 218 being formed to reflect light directed toward the central area. This central area is used during recording as a means of producing a control signal to indicate the speed of rotation of the disc 200.

Figure 8:
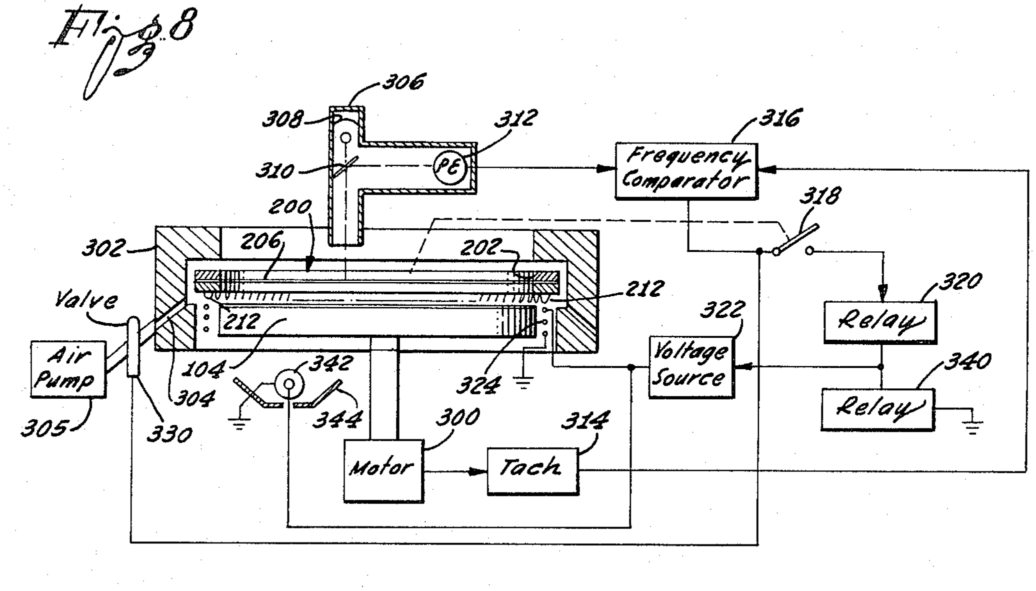
FIGURE 8 is a diagram, partly in mechanical section and partly in electrical blocks, of a system for recording on a copy disc the information on a working master.

FIGURE 8 shows apparatus for recording on the copy disc 200 information contained on the working master 104. In the apparatus shown in FIGURE 8, the working master 104 is rotated at a constant speed by a motor 300. The copy disc 200 is positioned adjacent the working master 104 with the photographic coating 206 facing the photographic information contained on the working master 104.

A member 302 having a U-shaped cross-section envelopes the ring 202 of the copy disc 200 and is adjacent to the working master 104. The member 302 around its circumference has a plurality of uniformly spaced holes which extend through the member 302 and act as air jets 304. The number of holes 304 preferably corresponds to the number of fins 212 in the copy disc 200. Air is supplied by an air pump 305 to force air against the fins 212 of the copy disc 200. When the information recorded on the working master 104 is video information such as that representing television programs, it would be desirable to use 525 fins and air jets. Since this number of fins 212 and air jets is equal to the number of lines in the television screen, and flutter in the system will be at the same frequency as the line frequency and will accordingly not be visible on the television screen.

The air pump 305 forces air through the jets 304 to rotate the copy disc 200 at the same speed of rotation as the working master 104. The air also supplies a lifting effect so that the copy disc 200 is rotated in a free-floating state so as to find its natural center of rotation. This compensates for any inconsistencies in the manufacture of the copy disc. If the copy disc is not accurately balanced during its manufacture, it still rotates around a natural point of rotation to give a stable rotation of the copy disc.

FIGURE 8 also shows a system for determining when the copy disc 200 and the working master 104 are rotating at the same speed so that the copy disc may be secured to the working master and so that the information on the working master may thereafter be transferred to the copy disc. The central area 214 of the copy disc 200 illustrated in FIGURE 4 has alternate sections 216 to absorb light directed at the central area 214 and other sections 218 to reflect light. A pickup means 306 is positioned above the central area 214 and includes a source of light 308. The light is directed through a one-way mirror 310 to strike the central area 214 and the light is alternately reflected and absorbed by the central area. The reflected light is directed back to the one-way mirror 310 and is reflected to a photoelectric cell 312. The photoelectric cell 312 accordingly produces an electrical signal having a frequency dependent upon the speed of rotation of the copy disc 206.

A tachometer 314 is operatively coupled to the motor 300 to develop an electrical signal in accordance with the speed of rotation of the motor and the working master 104. The signals from the photoelectric cell 312 and the tachometer 314 are applied to a frequency comparator 316 which produces an output signal in accordance with any difference in frequency between the two signals.

After the copy disc 200 is set in rotation, the switch 318 is closed either manually or in response to an alternating signal from the photoelectric cell 312. When the switch 318 becomes closed, the signal from the frequency comparator 316 is applied to a relay 320. During the time that the working master 104 and the copy disc 200 are rotating at different speeds, a signal is produced by the frequency comparator 316 and is applied to the solenoid 320 to energize the solenoid and maintain the relay open against a biasing action in the relay for closing the relay. When the copy disc 200 and the working master 104 are rotating at the same speed, the amplitude of the output signal from the frequency detector 316 becomes zero and the relay 320 closes.

A source of potential such as a battery 322 has one terminal connected to the relay 320 and the other terminal connected to one side of a coil 324. The other side of the coil 324 is connected to a suitable reference potential such as ground. When the relay 320 closes, the battery voltage is applied to the coil 324 to obtain a flow of current through the coil with the resultant production of an electromagnetic force. The ring 202 is either made of magnetic material or has embedded magnetic particles. The coil 324 is wound around the working master 104 in adjacent relationship to the copy disc 200 so as to attract the ring 202 into clamped relationship with the working master. By clamping the working master 104 to the copy disc 204 at the synchronous speed of rotation of these members, neither the working master nor the copy disc can be scratched or scraped at their surfaces so that the fidelity of the information on the working master is retained and the photographic surface of the copy disc is also not marred. The information on the working master 104 is now transferred or recorded on the photographic coating 206 of the copy disc 200.

It will be appreciated that other means than the area 214 may be used to detect the speed of the copy disc 200. Other means than the relay 320 and the coil 324 may be used to clamp the copy disc 200 to the working master 104 when the speed of rotation of the copy disc 200 becomes the same as that of the working master 104. For example, a vacuum pressure may be applied to the copy disc 200 to press the copy disc against the working master 104 when the speeds of rotation of the copy disc and the working master become equal.

FIGURE 8 also shows means for regulating the speed of rotation of the copy disc 200 in accordance with any differences between the speed of rotation of the copy disc 200 and the working master 104. Such means include the frequency comparator 316 which is constructed to provide a signal of one polarity for rotational speeds of the copy disc 200 less than those of the working master 104 and to provide a signal of opposite polarity for rotational speeds of the copy disc 200 greater than those of the working master 104. The signals from the frequency comparator 316 are introduced to a valve 330 to control the operation of the valve. In this way, the pneumatic force applied by the air pump 305 against the fins 212 on the copy disc 200 are varied to adjust the rotational speed of the copy disc to that of the working master 104.

When the rotational speed of the copy disc 200 has been adjusted to that of the working master 104, a relay 340 becomes closed. The relay is provided with delay characteristics so as to become closed a particular time after the relay 320 becomes closed. This insures that the relay 340 does not become closed until after the copy disc 200 has become clamped to the working master 104 by the energizing of the coil 324. When the relay 340 becomes closed, a continuous circuit is established through the voltage source 322, a light source 342 and the relay 340. The light source 342 is constructed to bathe the working master 104 and the copy disc 200 with light as the copy disc and the working master rotate in synchronism. In this way, the pattern of information on the working master 104 becomes transferred to the copy disc 200 during the rotation of the copy disc and the master. Reflectors 344 may be provided to insure that the light from the source 342 becomes directed only to the copy disc 200 and the working master 104.

Figure 9:
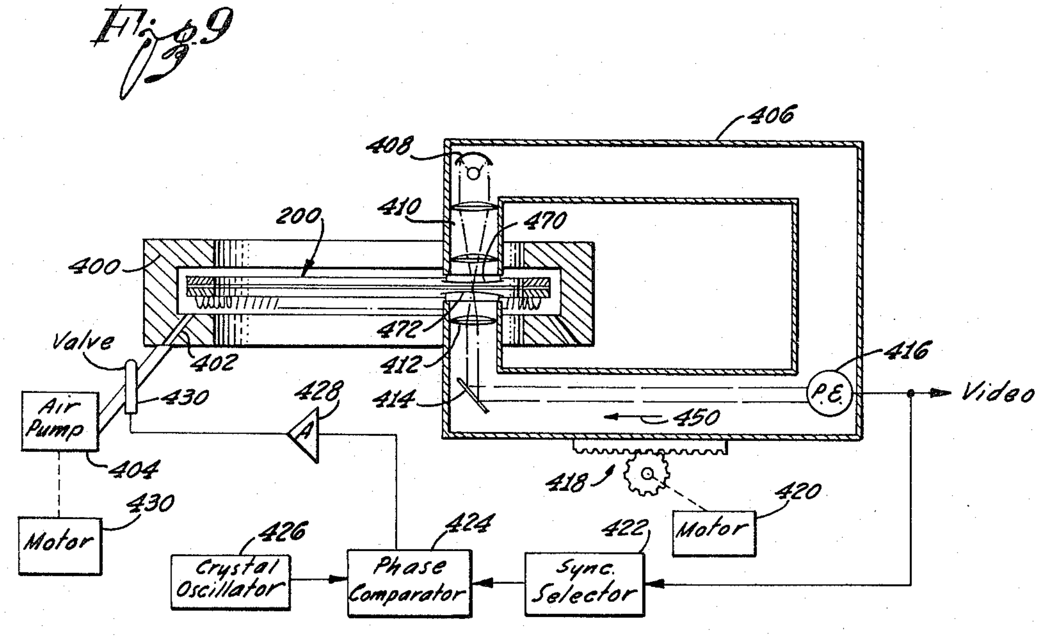
FIGURE 9 is a diagram, partly in mechanical section and partly in electrical blocks, of a system for reproducing the information previously recorded on a copy disc.

FIGURE 9 shows a system for reproducing information which has been recorded ont he copy disc 200. The system shown in FIGURE 9 includes a member 400 which is similar in construction to the member 302 illustrated in FIGURE 8 and which envelops the copy disc 200. The member 400 has air jets 402 which are supplied with air under pressure from an air pump 404. The air passing through the jets 402 is directed against the fins 212 on the copy disc 204 to maintain the copy disc in a free-floating state and to rotate the copy disc in the free-floating state. By rotating the copy disc 200 in a free-floating state during the reproduction of the information on the disc, the copy disc is provided with the same natural center of rotation as during the recording of the information on the copy disc.

An arm generally indicated at 406 is positioned to pick up the information located on the copy disc 200. The arm 406 includes a light source 408 which supplies a beam of light to a lens system 410. The beam of light is focused by the lens system 410 to strike the surface of the copy disc 200. The light beam is modulated in intensity at successive instants in accordance with the variations in light transmission characteristics of the copy disc at progressive positions along the spiral track on the disc. The beam of light then passes through an additional lens 412, which focusses the light on the surface of a mirror 414. The mirror 414 directs the light beam to a photoelectric cell 416 which produces an electrical signal having at each instant an amplitude in accordance with the variable intensity of the light beam.

The pickup arm 406 is driven at a constant rate in a radial direction along the copy disc 200, as indicated by an arrow 450. This is accomplished, for example, by a rack and pinion 418 which is driven by a motor 420. It will be appreciated that other means than the rack-and-pinion may be used for moving the pickup arm in the radial direction 450. For example, a lead screw arrangement may be used.

FIGURE 9 also includes a system for maintaining the speed of the copy disc constant at a particular speed of rotation when the information on the copy disc is video information. The output from the photocell 416 is applied to a sync selector 422 which passes only the horizontal sync signal included in the video signal. The horizontal sync signal is then applied to a phase comparator 424 which also receives a stable output from a crystal oscillator 426. The phase comparator 424 is constructed to produce a signal having a phase and amplitude in accordance with any difference in phase between the horizontal sync signal and the signal from the oscillator 426.

The signal from the comparator 424 is amplified as at 428 and is then applied to a valve 430 corresponding to the valve 330 in FIGURE 8. The valve 430 is disposed to control the amount of air passing from the air pump 404 to the fins 212 on the copy disc 200 and to provide such control in accordance with the phase and amplitude of the signal from the comparator 424. In this way, the rotational speed of the copy disc 200 during the reproduction of the information from the disc is regulated at a substantially constant value to obtain a high-fidelity reproduction of such information. The regulation is such as to reduce the amplitude of the error signal from the phase comparator 424 to a value of substantially zero.

It will be appreciated that other means may be used for maintaining the speed of the copy disc constant at a particular speed of rotation. For example, if the signal recorded on the copy disc does not include a sync signal, the fins 212 may be used to develop a control signal to be applied to the phase comparator 424. This is accomplished by sensing the passage of the individual fins or indentations, whichever is used, during the rotational movement of the copy disc. The fins or indentations may be sensed by an electrostatic transducer, by a magnetic transducer or by a pressure-sensing transducer responsive to the pressure pulses created by the fins or indentations.

As will be seen in FIGURE 9, a pair of angular guides 470 and 472 are disposed in contiguous relationship to the opposite flat surfaces of the copy disc 200. Each of the guides 470 and 472 is provided with a convex configuration so as to be adjacent to the disc 200 at a central position and so as to be progressively displaced from the disc at progressive positions toward the end of the guide. By providing the convex guides 470 and 472, the air moves through the space between each of the guides and the flat surfaces on the disc 200 to create a Bernoulli effect after the air has been directed against the fins 212 on the disc 200. This Bernoulli effect is instrumental in providing an air cushion on both flat surfaces of the disc 200 such that the disc tends to become centered between the convex guides 470 and 472.

Figure 10A:
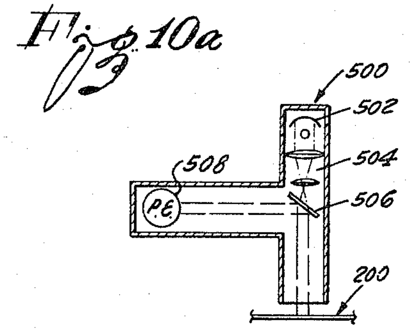
FIGURE 10A is a fragmentary elevational view of alternative pickup means for reproducing the information previously recorded on the copy disc from that shown in FIGURE 9.
Figure 10B:
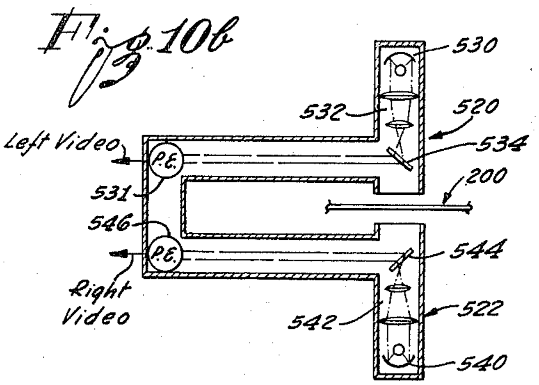
FIGURE 10B is a fragmentary elevational view of pickup means for use with copy discs having recordings on both flat surfaces of the discs such as for stereoscopic recordings.

FIGURES 10A and 10B show alternate pickup arms which can be used in place of the pick-up shown in FIGURE 9 and described in detail above. In the embodiment shown in FIGURE 10A, the pickup arm 500 includes a source 502 of light. The source of light produces a light beam which is focused by a lens system 504. The light beam passes through a one-way mirror 506 and strikes the disc 200. The disc 200 has a reflective backing member which reflects the energy in accordance with the surface characteristics of the disc so as to provide the energy with modulated characteristics representing the recorded information. The modulated light energy is reflected by the one-way mirror 506 and is applied to a photocell 508. The photocell 508 produces an electrical signal in accordance with the modulated light energy. This type of pickup arm eliminates the necessity of having the pickup arm located on both sides of the copy disc.

FIGURE 10B shows a pair of pickup arms which are generally indicated at 520 and 522 and which are intercoupled to move in synchronism. Each of the pickup arms 520 and 522 has the same construction as that shown in FIGURE 10A. For example, the pickup arm 520 includes a source 530, a lens system 532, a mirror 534 and a photoelectric cell 536 and the pickup arm 522 includes a source 540, a lens system 542, a mirror 544 and a photoelectric cell 546. The structure of FIGURE 10B is used to detect stereoscopic information contained on the disc 200. The disc has a reflective quality and there is information on both sides of the disc in accordance with a three-dimensional picture.

Figure 8A:
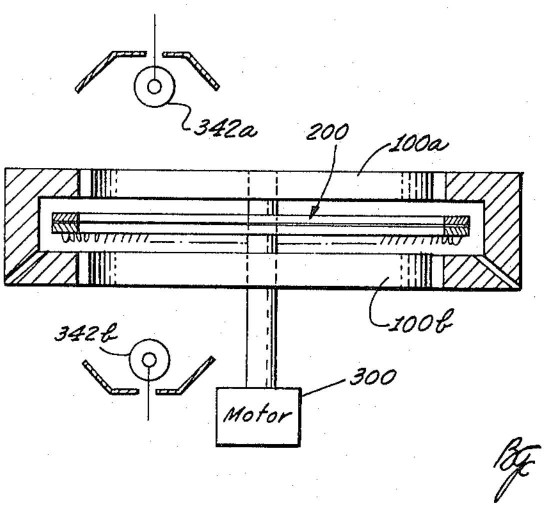
FIGURE 8A is a somewhat schematic diagram of a system for recording on both sides of a copy disc the information from a pair of working masters where such information may represent stereoscopic information.

The information on each side of the disc 200 may be recorded in a manner similar to that described above. The recording on the two sides of the disc may occur simultaneously or the recording on one side of the disc may occur after the recording on the other side of the disc. For example, as illustrated in FIGURE 8A, information is recorded simultaneously on both sides of the copy disc 200 from a pair of working masters 100*a* and 100*b* which are driven synchronously by the motor 300. The information is recorded by simultaneously controlling the energizing of a pair of light sources 342*a* and 342*b* in a manner similar to that described above for the light source 342 in FIGURE 8.

Figure 11:
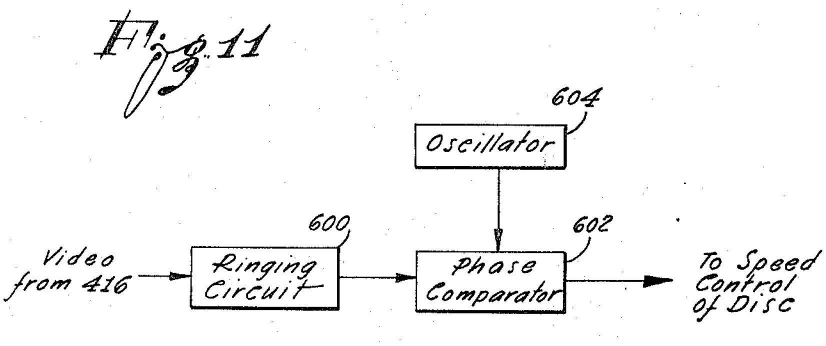
FIGURE 11 is a fragmentary view in block form of alternative system for controlling the rotational speed of the copy disc, this system being particularly adapted for use with color television information.

FIGURE 11 shows an alternative control circuit which may be used in place of that shown in FIGURE 9 when information representing color is being reproduced as for color television. The information on the copy disc contains a color burst which includes a plurality of signals at a particular frequency in a manner similar to the use of color bursts in color television systems at present. The color burst precedes the information for a frame and serves as a reference for the color information in the frame. The color burst is recorded on the copy disc 200 as alternate light and dark areas at the particular frequency.

Each color burst is used to control the operation of a ringing circuit 600 such that the ringing circuit produces a plurality of output signals at a particular frequency each time that a color burst appears on the disc 200. The output from the ringing circuit is applied to a phase comparator 602 which also receives signals at a constant frequency from an oscillator 604. When the rotational speed of the disc 200 is at the desired value, the frequency of the signals from the ringing circuit 600 is the same as the frequency of the signal from the oscillator 604. Deviations in the rotational speed of the copy disc from the desired value caused an output signal to be produced by the phase comparator 602 with a phase and amplitude dependent upon such deviations in speed. The output from the phase comparator 602 controls the speed of the copy disc in the same manner as the output signals from the phase comparator 424 in FIGURE 9. For example, the output from the phase comparator 602 may be applied to the valve 430 in FIGURE 9 to vary the amount of air passing through the jets 402 to the fins 212 on the copy disc 200, thereby varying the rotational speed of the copy disc.

It will be appreciated that other ways of controlling the speed of rotation of the copy disc may be provided. For example, electromagnetic means may be used to control the speed of the disc. As shown in FIGURE 8, an electromagnet may be in proximity to the outer ring 202 of the disc and, in the case of FIGURE 8, it is used to secure the disc to the working master. However, it will be appreciated that the degree of magnetic attraction may be varied so as to operate as a magnetic brake and this can be used to control the speed of the disc 200.

Although this application has been disclosed and illustrated with reference to particular applications, the principles involved are susceptible of numerous other applications which will be apparent to those skilled in the art. The invention is, therefore, only to be limited by the scope of the appended claims.

What is claimed is:

1. A transducing system for use with a recording member having characteristics for storing variable information on the recording member in a track in the form of variable light transmission characteristics representative of such variable information, including, first means disposed relative to the recording member for producing a flow of fluid, second means operatively coupled to the recording member and having characteristics for converting the flow of fluid to a rotary movement of the recording member, means operatively coupled to the first means and disposed relative to the second means for directing the flow of fluid from the first means toward the second means to produce a rotation of the recording member in a free-floating state, and means disposed relative to the recording member for obtaining a transducing action between the variable information and the variable light transmission characteristics in the track on the recording member during the rotation of the recording member.

2. A transducing system for use with a recording member having characteristics for storing variable information on the recording member in a track in the form of variable light transmission characteristics representative of such variable information, including, first means disposed relative to the recording member for producing a variable flow of air under pressure, second means operatively coupled to the recording member and having characteristics for converting the flow of air under pressure to a force against the member with two components, one component providing a rotary movement of the recording member and the other component providing a free-floating state for the recording member, third means operatively coupled to the first means and disposed relative to the second means for directing the flow of air from the first means toward the second means to produce a free-floating rotation of the recording member, means disposed relative to the recording member for providing a transducing action between the variable information and the variable light transmission characteristics in the track on the rotating member during the rotation of the recording member, and means for adjusting the introduction of air under pressure to the recording member to regulate the speed of rotation of the recording member for the production of the transducing action.

3. A transducing system for use with a recording member having characteristics for storing variable information on the recording member in a track in the form of variable light transmission characteristics representative of such variable information, including, first means disposed relative to the recording member for producing a flow of fluid under pressure, second means operatively coupled to the recording member and having characteristics for converting the flow of fluid to a force against the recording member with two components, one component providing a rotary movement of the recording member and the other component providing a free floating state for the recording member, means operatively coupled to the first means and disposed relative to the second means for directing the flow of fluid under pressure toward the second means to produce a free-floating rotation of the recording member, means operatively coupled to the recording member and responsive to variations in the rotary movement of the recording member from a particular speed for producing a control signal having characteristics in accordance with such variations in the rotary movement of the recording member, means responsive to the control signal for varying the flow of the fluid toward the recording member in accordance with the characteristics of the control signal to compensate for any variations in the rotary movement of the recording member from the particular speed, and means disposed relative to the recording member for obtaining a transducing action between the variable information and the variable light transmission characteristics in the track on the recording member during the rotation of the recording member.

4. In combination in a system for reproducing information contained on a track of variable characteristics on a recording member by the direction of energy toward the recording member to vary the intensity of the energy in accordance with the information, first means disposed relative to the recording member for providing a force having a rotary component, second means operatively coupled to the first means and physically decoupled from the recording member for directing the force toward the recording member to produce a rotation of the recording member by the rotary component, means disposed adjacent to the recording member for directing a beam of energy toward the recording member during the rotation of the recording member to obtain variations in the intensity of the beam of energy in accordance with the variable characteristics representing information contained on the track on the recording member, means operatively coupled to the last mentioned means for reproducing the information in accordance with the variations in the intensity of the beam, and means operatively coupled to the last mentioned means and to the first means for varying the force having the rotary component to obtain the reproduction of the information at a substantially constant rate.

5. In combination in a system for reproducing information contained on a track of variable characteristics on a recording member by the direction of energy toward the recording member to vary the intensity of the energy in accordance with the information, first means disposed relative to the recording member for providing a fluid force having a first rotary component and having a second component perpendicular to the first rotary component, second means operatively coupled to the first means and disposed relative to the recording member for directing the fluid force toward the recording member to produce a rotation of the recording member by the rotary component of the fluid force and to produce a free-floating state of the recording member by the second component of the fluid force, and means disposed adjacent to the recording member for directing a beam of energy toward the recording member as the recording member rotates in a free-floating state to vary the intensity of the beam of energy in accordance with the variable characteristics representing information contained on the track on the recording member.

6. In combination in a system for reproducing information including a signal occurring at a repetitive rate contained on a track of variable characteristics on a recording member by the direction of energy toward the recording member to vary the intensity of the energy in accordance with the information, first means operatively coupled to the recording member for providing a rotational movement of the record member, second means disposed adjacent to the recording member for directing a beam of energy toward the recording member during the rotation of the recording member to obtain variations in the intensity of the beam of energy from the recording member in accordance with the variable characteristics representing the information contained on the annular track on the recording member, third means operatively coupled to the recording member and responsive to variations in the rate of reproduction of the repetitive signal from the recording member to produce a control signal having characteristics in accordance with such variations, fourth means operatively coupled to the first means and responsive to the control signal to regulate the rotational movement of the recording member in accordance with the characteristics of the control signal to regulate the rate at which the repetitive signal is reproduced from the recording member, and fifth means responsive to the variations in the intensity of the beam from the recording member for producing signals having variable characteristics in accordance with the variations in the intensity of the beam.

7. The combination of claim 6 wherein the information contained on the recording member is video information and wherein the signal occurring at a repetitive rate is the horizontal sync signal included within the video information.

8. The combination of claim 6 wherein the information contained on the recording member is video information representing a color signal and wherein the signal occurring at a repetitive rate is the color burst included within the color video information.

9. In combination in a system for reproducing color video information contained on a track of variable characteristics on a recording member by the direction of energy toward the recording member to vary the intenisty of the energy in accordance with the color video information, first means operatively coupled to the recording member for providing a rotational movement of the recording member, second means disposed adjacent to the recording member for directing a beam of energy toward the recording member during the rotation of the recording member to obtain variations in the intensity of the beam of energy from the recording member in accordance with the variable characteristics representing the color video information contained on the annular track on the recording member, third means operatively coupled to the recording member and responsive to variations in the rate of reproduction of the color video reproduction from the recording member to produce a control signal having characteristics in accordance with such variations, fourth means operatively coupled to the first means and responsive to the control signal to regulate the rotational movement of the recording member in accordance with the characteristics of the control signal to regulate the rate at which the color video signal is reproduced from the recording member, and fifth means responsive to the variations in the intensity of the beam from the recording member for producing signals having variable characteristics in accordance with the variations in the intensity of the beam.

10. In combination in a system for reproducing stereoscopic information divided into first and second channels and respectively contained on two tracks of variable characteristics on two opposing surfaces of a recording member by the direction of energy toward the two opposing surfaces of the recording member to vary the intensity of the energy in accordance with the stereoscopic information where the recording member is constructed to prevent the beam of energy directed toward each surface of the member from passing to the other surface of the member, means operatively coupled to the recording member for providing a rotational movement of the recording member, means disposed adjacent to one opposing surface of the recording member for directing a first beam of energy toward the recording member as the recording member rotates to vary the intensity of the first beam of energy in accordance with the variable characteristics representing the first channel of the stereoscopic information contained on the track on the one surface of the recording member, means responsive to the variable intensity of the first beam of energy to produce a first output signal in accordance with the characteristics of such variable intensity to reproduce the first channel of the stereoscopic information on the one surface of the recording member, means disposed adjacent to the other opposing surface of the recording member for directing a second beam of energy toward the recording member as the recording member rotates to vary the intensity of the second beam of energy in accordance with the variable characteristics representing the second channel of the stereoscopic information contained on the other surface of the recording member, means responsive to the variable intensity of the second beam of energy to produce a second output signal in accordance with the characteristics of such variable intensity to reproduce the second channel of stereoscopic information on the other surface of the recording member, and means responsive to at least one of the first and second output signals and operatively coupled to the recording member for varying the rate of rotation of the recording member to obtain the reproduction of the information from the opposing surfaces at a substantially constant rate.

11. In combination in a system for reproducing information contained on a track of variable characteristics on a thin flat disc member by the direction of energy toward the disc member to vary the intensity of the energy in accordance with the information, means operatively coupled to the thin disc member for providing a rotational movement of the member, means disposed adjacent to the disc member for directing a beam of energy toward the disc member as the disc rotates to vary the intensity of the beam of energy in accordance with the variable characteristics representing information contained on the track on the disc member, means responsive to the variable intensity of the beam of energy for producing signals having variable characteristics in accordance with the variable intensity of the beam of energy, means disposed adjacent to the thin flat disc on opposite sides of that flat disc as the disc rotates to provide an air cushion on both flat sides of the disc for physically stabilizing the disc during reproduction of the information on the disc, and means responsive to the production of the signals having the variable characteristics for regulating the speed of rotation of the disc member to obtain the production of the signals at a substantially constant rate.

12. The combination set forth in claim 5 wherein means are included for reproducing the information in accordance with the variations in the intensity of the beam at each instant and wherein means are also included for operating upon the first means to control the rotation of the recording member at each instant for obtaining the reproduction of the information from the recording member at a substantially constant rate.

References Cited

UNITED STATES PATENTS

| | | | |
|---|---|---|---|
| 2,422,398 | 6/1947 | Dilks | 179—100.3 |
| 2,858,374 | 10/1958 | Goldmark | 179—100.4 |
| 3,138,669 | 6/1964 | Rabinow | 178—6.6 |
| 1,843,551 | 2/1932 | Fruwirth | 95—74 |
| 2,789,491 | 4/1957 | Blandhoel et al. | 95—73 |
| 2,149,636 | 3/1939 | Slaughter | 96—67 |
| 2,735,771 | 2/1956 | Fordyce et al. | 96—67 |
| 2,905,755 | 9/1959 | Neale | 178—5.4 |
| 2,951,116 | 8/1960 | Sites et al. | 178—5.4 |
| 3,166,997 | 1/1965 | Barcia | 179—100.2 |

ROBERT L. GRIFFIN, *Primary Examiner.*

ROBERT SEGAL, JOHN W. CALDWELL, *Examiners.*

H. W. BRITTON, *Assistant Examiner.*